June 30, 1942. L. B. GREEN 2,287,933
TANGENT BENDER
Filed June 22, 1940 9 Sheets-Sheet 1

INVENTOR.
*Lee B. Green*
BY *Kwis Hudson Kent*
ATTORNEYS

L. B. GREEN 2,287,933

TANGENT BENDER

Filed June 22, 1940

INVENTOR.
Lee B. Green
BY Kwis Hudsone Kent
ATTORNEYS

June 30, 1942.　　　L. B. GREEN　　　2,287,933
TANGENT BENDER
Filed June 22, 1940　　　9 Sheets-Sheet 5

INVENTOR.
LEE B. GREEN
BY
Kwis Hudson & Kent
ATTORNEYS

June 30, 1942. L. B. GREEN 2,287,933
TANGENT BENDER
Filed June 22, 1940 9 Sheets-Sheet 8

INVENTOR.
*Lee B. Green*
BY 
ATTORNEYS

Patented June 30, 1942

2,287,933

UNITED STATES PATENT OFFICE 2,287,933

TANGENT BENDER

Lee B. Green, Lakewood, Ohio, assignor to Cyril J. Bath, Chagrin Falls, Ohio

Application June 22, 1940, Serial No. 341,945

16 Claims. (Cl. 153—48)

This invention relates to metal working apparatus, and more particularly to an improved machine by which flanged metal members can be bent or formed to a desired shape substantially without buckling or distortion of the flange or flanges of such members.

The metal working art has frequently been called upon to produce metal structures such as frame members or carlings, cabinet sections, and the like having portions thereof bent or formed to a desired shape and also having a flange or flanges extending along such bent or formed portion for stiffening or fastening purposes. As an example of a structure of this kind, I might mention a cabinet section for domestic refrigerators in which the side and top walls are integrally connected and are provided with flanges at their front and rear edges for stiffening purposes and for attaching thereto the door and rear wall. As another example, I might mention curved frame members or carlings frequently used for supporting a deck or the roof of railway cars or similar structures, and in which it is desirable to have the stiffening flange or flanges extending continuously around the curved or bent portion. Heretofore it has not been possible to produce structures of this kind directly from flanged stock or structural bars by a simple cold bending or forming operation because the bending of the stiffening flange in its own plane has caused buckling or distortion thereof. To avoid such buckling or bending of the stiffening flange, attempts have been made to notch this flange to get rid of the excess material, but this procedure is not only costly but such notching requires welding or splicing to compensate for the weakening of the flange and this results in a rough and irregular product.

However, by the use of my improved bending apparatus, as will be disclosed hereinafter, flanged metal sheets or structural bars can be formed directly to a desired curved or arched shape by a cold bending operation and it may, therefore, be said to be an object of this invention to provide improved metal working apparatus by which such bending of flanged metal stock can be successfully carried out substantially without buckling of the flange or flanges thereof to thereby directly and economically produce cabinet sections, frame members and the like of a desired shape and in which the stiffening or fastening flange or flanges extend smoothly and uninterruptedly around the bent portions.

Another object of my invention is to provide improved metal working apparatus for the purpose indicated, having cooperating dies engageable with opposite sides of a flanged metal member and operable to form a bend in the web portion of such member and to simultaneously bend the stiffening flange or flanges of the member within their own plane or planes.

Still another object of my invention is to provide improved metal working apparatus of this character having cooperating dies engageable with opposite sides of a flanged metal workpiece including die members operable to form a bend in the web and flange portions thereof, and in which means is provided for holding the flange or flanges of such workpiece against buckling or distortion during such bending.

A further object of my invention is to provide an improved metal working machine of the character referred to having cooperating die members adapted to operate on a flanged metal workpiece to bend the same substantially without buckling or distortion of the flange or flanges thereof, and in which one of the die members is arranged for rocking movement relative to the other or others and is held against relative slipping or skewing during such rocking movement.

Still another object of my invention is to provide improved metal working apparatus of the character just mentioned in which a swinging structure is employed for actuating such rocking die member and applying pressure thereto.

Yet another object of my invention is to provide improved metal working apparatus of the type indicated having cooperating die members adapted for gripping engagement with opposite sides of an intermediate section of an elongated flanged metal workpiece and other die members arranged for rocking movement for bending the oppositely projecting portions of the metal workpiece toward each other substantially without buckling or distortion of the flange or flanges thereof, and in which sequentially operating power means is provided for opening and closing the gripping die members and for actuating the bending die members.

Still another object of my invention is to provide improved metal working apparatus of the character above referred to having cooperating die members arranged to operate on a flanged metal workpiece to bend the same substantially without buckling or distortion of the flange or flanges thereof and in which one of the die members is carried by a reciprocable slide and is adapted to swing relative to such slide after the die members have been opened to cause further separation of the die members for facilitating the ejection of the workpiece.

My invention may be further briefly summarized as consisting in certain novel combinations and arrangements of parts hereinafter described and particularly set out in the appended claims.

In the accompanying sheets of drawings.

Further reference will now be made to the accompanying drawings for the purpose of describing the construction and operation of a metal working machine embodying my invention, and although detailed reference is made to the machines illustrated in the drawings, it will be understood, of course, that the invention is not limited to these particular machines, but includes all other similar machines and apparatus coming within the scope of the appended claims.

Figures 7, 8:
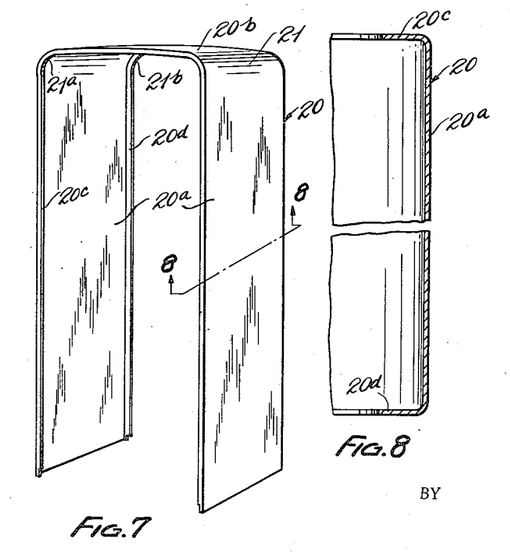
Fig. 7 is a perspective view showing a workpiece as delivered by my metal working machine, the workpiece being in the form of a section of a metal cabinet.
Fig. 8 is a sectional view, on a larger scale, taken through the workpiece, as indicated by section line 8—8 of Fig. 7, and showing the flanges thereon.
Figure 9:
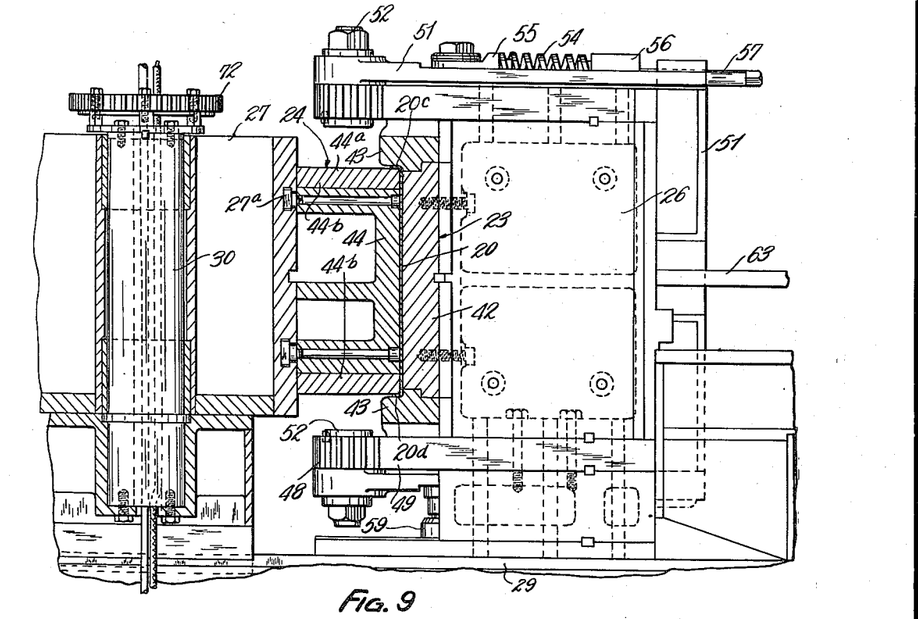
Fig. 9 is a partial longitudinal sectional view taken through the machine, as indicated by line 9—9 of Fig. 2.
Figure 10:
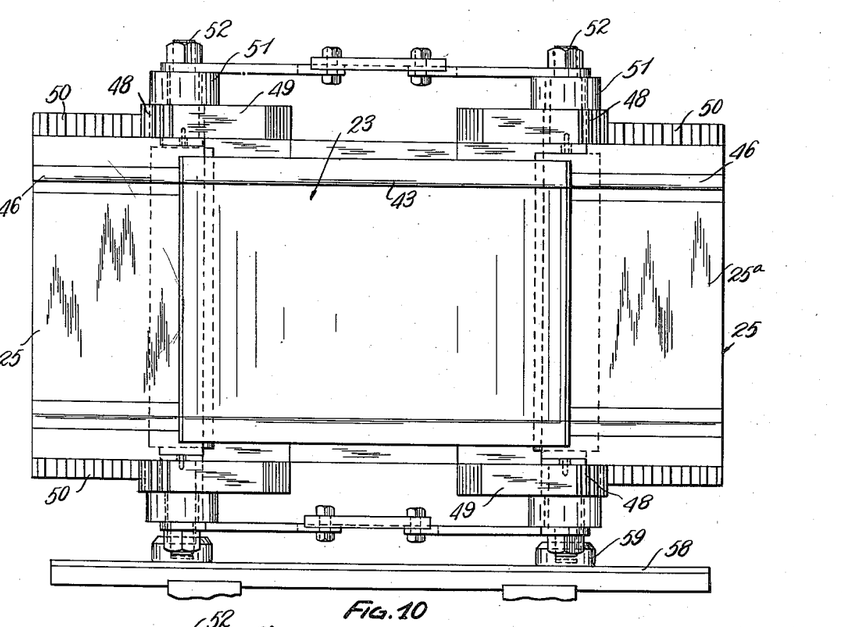
Fig. 10 is an elevational view looking toward one of the clamping dies and the adjacent bending dies, as indicated by line 10—10 of Fig. 1.
Figure 11:
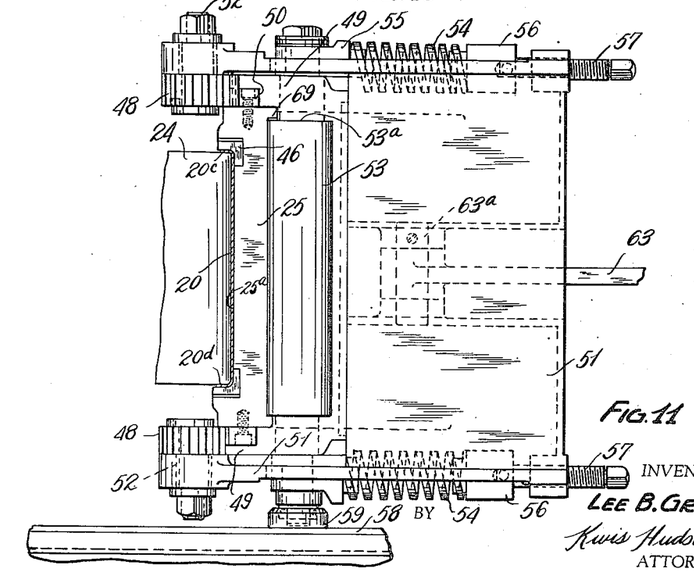
Fig. 11 is a partial side elevation showing one of the bending dies and the actuating means therefor, as indicated by line 11—11 of Fig. 2.

My improved metal working machine, which is at times referred to as a "tangent bender," may be used for rapidly and economically producing various metal structures from flanged workpieces or structural shapes by a bending operation, as has been indicated above. In Figs. 7 and 8 I show a section 20 of a metal cabinet as representing the article or workpiece produced by the machines shown in the drawings and to be hereinafter described, but it will be readily understood that with appropriate dies in the machines various other articles or workpieces could be produced. This cabinet section 20 may be a portion of the cabinet or box of a domestic refrigerator and may be of a substantially inverted U-shape in which the portions 20a form the sides of the cabinet and the connecting portion 20b forms the top. Flanges 20c and 20d extend continuously along the front and back edges, respectively, for stiffening the structure and for connecting the door and rear wall therewith. These flanges have curved portions 21a and 21b which extend without interruption around the bends or curved portions 21 connecting the sides 20a with the top 20b.

By the use of my improved machine, the cabinet section 20 can be formed directly from an elongated sheet metal workpiece having the flanges 20c and 20d extending longitudinally along the edges thereof. As will be explained more fully hereinafter, this is accomplished by clamping between cooperating die members an intermediate section of the flanged workpiece corresponding with the top 20b and then bending the oppositely projecting portions of the workpiece toward each other to form the U-shaped cabinet section shown in Fig. 7. The top 20b of the cabinet section may be flat or may be bowed or crowned as shown in Fig. 7 and, in the latter case, the corresponding section of the workpiece which is clamped by the die members is also subjected to a drawing or forming operation thereby. During the bending of the workpiece to provide the parallel sides 20a, the web portions of the workpiece are bent or deflected out of their own plane by forming the substantially 90° transverse bends 21 therein, and the flanges 20c and 20d are simultaneously bent within their own planes and are held against buckling or distortion so that the curved flange portions 21a and 21b in the finished cabinet section 20 have the same smooth and regular form as the other portions of the flanges. For convenience in following the sequence of operations of the machine and the shaping of the workpiece, I have used the reference character 20 to designate the workpiece as well as the cabinet section formed therefrom.

Figure 1:
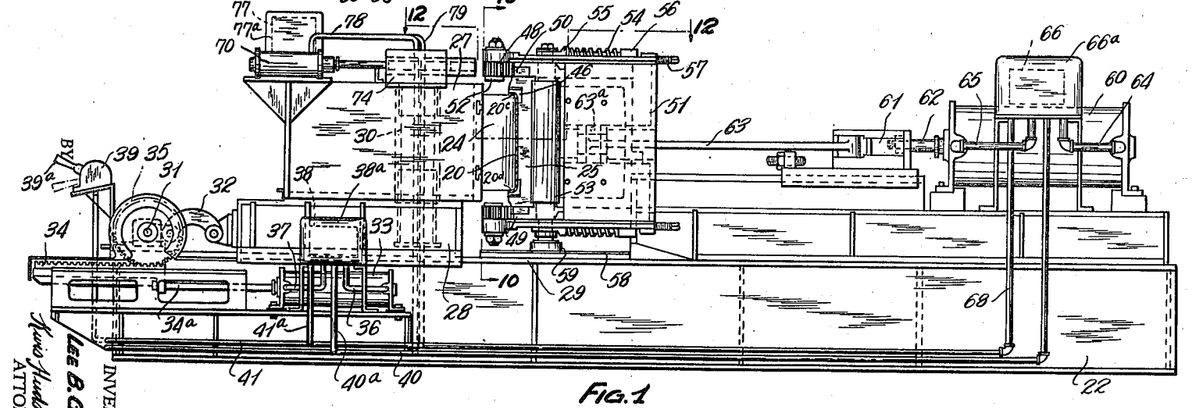
Fig. 1 is a side elevation of a metal working machine embodying my invention and with the workpiece shown therein in cross-section.
Figure 2:
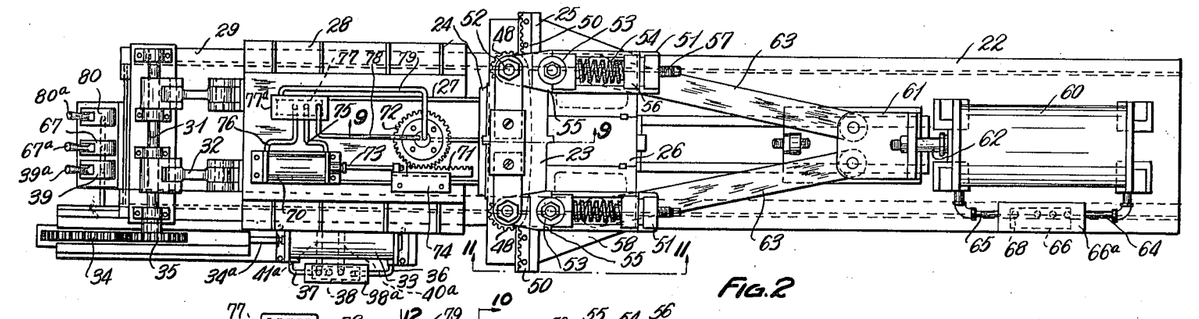
Fig. 2 is a plan view thereof with the workpiece omitted.

My improved metal working machine or tangent bender, by which articles such as the cabinet section 20 can be rapidly and economically produced from flanged metal stock, is shown in Figs. 1 and 2 as having an elongated base or frame 22 upon which the various parts of the machine are arranged. The machine also includes a pair of cooperating clamping or forming die members 23 and 24 engageable with opposite sides of an intermediate section of the flanged workpiece 20 and a pair of bending dies 25 arranged for rocking or translatory movement for bending oppositely extending portions of the workpiece toward each other to form the sides 20a of the cabinet section.

The die member 23 may be carried by a mount 26 which is suitably connected with or built upon the frame 22 and may be referred to as the stationary or female clamping die member. The die member 24, which may be referred to as the male die member, is movable toward and away from the stationary die member 23 to close upon, or release, the work and this movable die member may be suitably mounted on a die carrier 27 which is in turn carried by a reciprocable die slide 28. The die slide 28 is reciprocably supported by suitable ways 29 provided on the frame 22 so that the die members 23 and 24 may be readily closed or opened by corresponding closing and opening movements of the slide. The die carrier 27 is pivotally mounted on a spindle 30 carried by the slide 28 so that, after the clamping dies 23 and 24 have been opened, the die member 24 can be swung to the position shown in Figs. 3 and 4 to further separate the die members and facilitate the ejection of the workpiece or cabinet section 20, as will be more fully explained hereinafter.

The slide 28 may be reciprocated by any suitable power means for opening and closing the clamping dies 23 and 24 and for this purpose I here show a crankshaft 31 connected with the slide by means of links 32 and adapted to be oscillated or rotated by a fluid pressure cylinder 33. The operating connection between this cylinder and the crankshaft 31 may comprise a longitudinally movable rack 34 connected with the piston of the cylinder by the rod 34a and a gear or gear sector 35 connected with the shaft 31 and meshing with the rack.

For moving the die slide 28 toward the right to close the clamping dies 23 and 24, pressure fluid is supplied to the right-hand end of the cylinder 33 through the pipe 36 and movement of the slide to the left for opening the dies is brought about by supplying pressure fluid to the left-hand end of the cylinder 33 through the pipe 37 and exhausting the fluid previously supplied through the opposite end by the pipe 36. The supply of pressure fluid to the ends of the cylinder 33 and the exhausting of the spent fluid therefrom may be controlled by a suitable solenoid valve 38 located in the housing or box 38a and controlled by a manually operable switch 39 having an operating handle 39a. The pressure fluid for actuating the cylinder 33 may be supplied to the solenoid valve by the fluid supply line 40 and the branch connection 40a. The control switch 39 may be suitably connected with the solenoid valve by wires extending through the conduit 41 and the branch conduit 41a. The solenoid valve may be of any commercially available construction and, therefore, need not be further illustrated. The switch 39 and the electrical connections to the solenoid valve are such that when the operating handle 39a is moved to the full line position shown in the drawings, the cylinder 33 will operate to close the dies 23 and 24 and when the lever is moved to its broken-line position, the cylinder will cause these dies to be opened.

The cooperating clamping die members 23 and 24 are best illustrated in Figs. 9, 12, 13 and 14 and from these views it will be seen that the stationary die member 23 comprises a plate-like portion or section 42 having a width substantially equal to that of the flanged workpiece 20 and having a pair of flanges or projections 43 along the upper and lower edges or sides thereof adapted to overlie and press against the outer faces of the flanges 20c and 20d of the workpiece. The projections 43 of this die member may be formed integral with the plate section 42, but preferably, are made as separate parts which are hardened and are suitably bolted or otherwise connected with the section 42 and the die mount 26.

The movable or male die member 24 may comprise a head-like structure of a width to extend snugly between the flanges 20c and 20d of the workpiece 20 and having upper and lower side faces 44a adapted to press against or supportingly engage the inner or adjacent faces of such flanges. The die member 24 may be formed in one piece or preferably, as here shown, may comprise a main intermediate section 44 to which hardened side plates or sections 44b may be suitably connected to provide the faces 44a which engage the flanges of the workpiece. This die member may be connected with the die carrier 27 by any suitable clamping means and by the T slots 27a provided in the latter.

Figures 12, 13, 14:
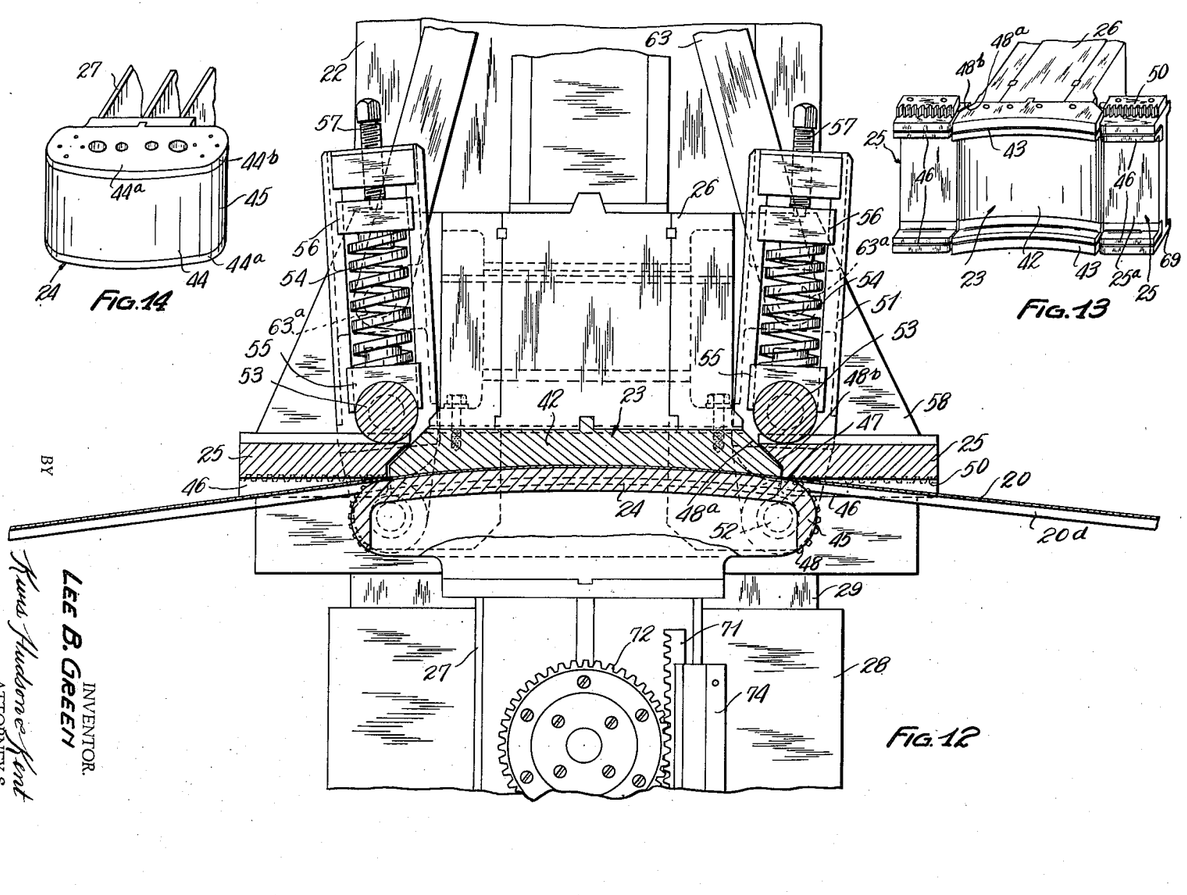
Fig. 12 is a partial plan view of the machine with the dies thereof shown in transverse section, as indicated by line 12—12 of Fig. 1, and with the dies in engagement with the workpiece preparatory to the bending thereof.
Fig. 13 is a detached perspective view showing one of the clamping dies and the bending dies adjacent thereto.
Fig. 14 is a detached perspective view of the other clamping die.
Figures 15, 16:
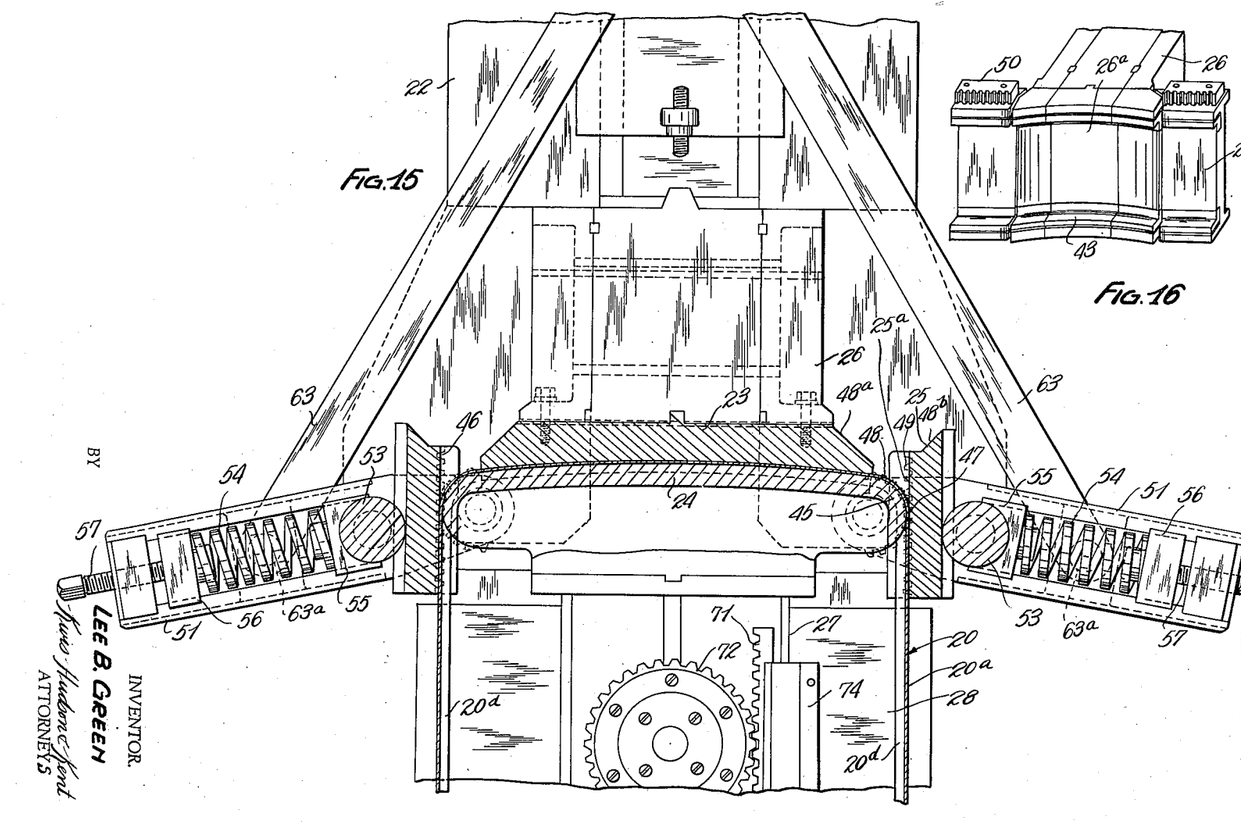
Fig. 15 is a view similar to Fig. 12, but showing the die members in the relative positions which they occupy just after the bending of the workpiece has taken place.
Fig. 16 is a detached perspective view similar to Fig. 13 but showing a modification in which the body of one of the clamping dies and the mount therefor are of a sectional construction.

As will be seen from the drawings, particularly Figs. 12 and 15, the die member 24 is somewhat longer than the die member 23 and has curved or rounded portions 45 at its opposite ends or upright side edges which extend laterally beyond the die member 23. These curved portions define the shape or curvature to which the flanged workpiece is to be bent or formed and serve as anvil elements or die portions during such bending or forming.

The die members 23 and 24 may be formed with bowed or crowned faces, as shown in the drawings, so that they will not only grip the web portion of the flanged workpiece, but will produce a drawing or forming operation thereon so as to give the top 20b of the cabinet section being formed, a correspondingly curved or bowed shape. These die members can however be formed with substantially flat faces to merely grip the workpiece as would be the case if the top of the cabinet section were to be flat instead of crowned. The proportions of the die members 23 and 24 will depend upon the width and depth of the cabinet section desired and when a wider or narrower cabinet section is to be made, different die members of corresponding proportions are substituted. The die member 23 is preferably of a length such that its ends or lateral edges lie at or adjacent the beginning of the curvature of the rounded portions 45 of the die member 24. To adapt the die mount 26 for use with die members of different sizes, I may provide a sectional construction for this mount so that by changing the size or number of the sections embodied therein, the mount can be adapted to properly support a die member 23 of the desired size. Likewise one or both of the clamping dies can be of such a sectional construction so that they can be readily changed in size by the addition or removal of an intermediate section 26a as shown in Fig. 16.

In shaping the flanged workpiece 20 to the cabinet-like form shown in Fig. 7, the portions of the flanged workpiece which project laterally from the die members 23 and 24 as seen in Fig. 12, are bent or deflected towards each other around the curved die portions 45 as mentioned above. To accomplish this bending of the workpiece, I provide the above-mentioned pair of bending dies 25 which may be of plate-like or shoe-like form and which cooperate with the curved portions 45 of the die member 24. The die members 25 are located at the ends or lateral edges of the die member 23 and form movable extensions or continuations of the latter. These bending dies have a substantially flat face 25a engageable with the web portion of the workpiece 20 and also have a pair of spaced flanges or projections 46 extending along their upper and lower side edges and aligned substantially with the flanges or projections 43 of the die member 23 and adapted to overlie the outer faces of the flanges 20c and 20d of the workpiece. The projections 46 may be formed as an integral part of the die members 25 but preferably are hardened separate parts connected with or recessed into these die members as shown in the drawings.

When the die members 23 and 24 have been closed on the workpiece 20 preparatory to the bending operation, the parts occupy the relative positions shown in Fig. 12 in which the bending dies 25 project laterally outwardly in opposite directions with the inner edges of their faces 25c substantially tangent to the curved die portions 45, the point or line of tangency being designated by the reference character 47. If desired, the adjacent edges of the die member 23 and the bending dies 25 may be provided with correspondingly bevelled or mating portions 48a and 48b, as shown in Fig. 12 so that the bending dies can move into alignment with, and form a substantial continuation of, the die member 23 with little or no interruption therebetween.

During the bending of the workpiece 20 by the die members 25, these members rock around the curved portions 45 of the die member 24 causing the point or line 47 of tangency to travel around the curved die portions from the position indicated in Fig. 12 to the position indicated in Fig. 15. The die members 25 are thus moved from a position of substantial alignment with the die member 23 to a position in which their faces 25a extend substantially normal to the face of the die member 23 and thereby cause the outwardly extending portions of the workpiece 20 to be bent into substantially parallelism, as shown in Fig. 15 in which position they lie adjacent opposite sides of the die carrier 27.

It will be observed that during this movement the bending dies 25 cause simultaneous bending of the flanges 20c and 20d of the workpiece as well as bending of its web portion, the bending of the flanges being however within their own planes. Since the flanges of the workpiece lie between, and are subjected to pressure by, the side faces of the die member 24 and the spaced projections or flanges of the die members 23 and 25, they will be held against buckling or distortion during the bending. It will be noted also that as the point of tangency 47 travels around the curved die portion 45, the projections 46 of the bending die bear against the flanges of the workpiece at opposite sides of the point of tangency, that is ahead of and following the point of tangency, and effectively hold the flanges against buckling or distortion. The spacing of the projections of the die member 23 and of the bending dies 25 with respect to the width of the workpiece is such that they will exert a substantial clamping pressure against the flanges of the workpiece and will have a smoothening or ironing action thereon.

It is important that there be no slippage or skewing of the bending dies relative to the workpiece during the rocking of the bending dies around the curved die portions 45 because if such relative slippage or skewing occurs the projections 25a of the bending dies will be wedged against the flanges of the workpiece at certain points and will tend to separate from these flanges at other points and this will cause jamming of the bending dies which may result in tearing or scoring of the work and in possible damage to the dies themselves. To avoid this I provide means for holding the bending dies against such slipping or skewing during the rocking movement thereof. This holding means may be in the form of gear sectors 48 provided on the arm portions 49 of die mount 26 above and below the die member 23 and correspondingly spaced racks 50 provided on the bending dies and meshing with these gear sectors. These meshing gear sectors and racks prevent relative slipping or skewing of the bending dies and confine the movement thereof so that the line of tangency 47 moves parallel to itself during the rocking. The gear sectors 48 and the curved portions 45 are so arranged that during the bending of the workpiece 20 its web portion lies substantially on or follows the pitch line of the gear sectors.

The above-described movement may be imparted to the bending dies 25 in various ways and for this purpose I preferably employ a pair of swinging wing-like structures 51 which are connected with the arm portions 49 of the die mount 26 by means of the pivot pins 52. The structures 51 may be of a hollow or frame-like construction and serve as mounts or carriers for pressure rollers 53 which bear against the outside of the bending dies 25 for pressing the latter toward the curved die portions 45 and against the workpiece. As shown in the drawings, the structures 51 carry coil springs 54 which are arranged to act on shiftable bearing members 55 for yieldingly pressing the rollers 53 against the bending dies with the desired degree of pressure. The compression of the springs may be varied by adjusting the outer spring seats 56 by means of the adjusting screws 57. The rollers 53 may be journaled in the wing-like structures 51, but the weight of the rollers is preferably taken by bearing plates 58 provided on the frame of the machine at a point below the die mount 26. The rollers may have depending portions or extensions provided with thrust bearings or caps 59 which seat on the plates 58 and slide over the surface thereof during swinging of the structures 51.

To obtain the above-mentioned desired rocking movement of the bending dies 25 the wing-like structures 51 are swung through an angular distance of approximately 110° from their position shown in Fig. 13. Any suitable power means may be employed for imparting this swinging movement to the wing-like structures 51 and in this instance I show a double acting pressure fluid cylinder 60 arranged on the frame 22 for this purpose. A reciprocable cross-head 61 may be suitably guided on the frame and may be connected with the piston of the cylinder 60 by the piston rod 62. Movement of the cross-head 61 may be transmitted to the wing-like structures 51 by a pair of relatively inclined or diverging links 63. These links have pivotal connection at one end with the cross-head 61 and at their opposite end are pivotally connected with the structures 51 by pivot pins 63a which are spaced a greater distance from the axes of the pivot pins 52 than are the axes of the rollers 53. With this arrangement it will be seen that the wing-like structures 51 serve as pivoted levers for actuating the pressure rollers. It will be observed that the axes of the pivot pins 52 coincide substantially with the centers of curvature for the curved die portions 45, and that the point of tangency between one of the bending dies and the curved die portion as well as the bearing point between the roller 53 and the bending die will always lie on the same radial line.

In causing closing movement of the bending dies 25, that is in causing these dies to be rocked toward each other for the purpose above explained, fluid pressure is supplied to the outer end of the cylinder 60 through the conduit 64 and for moving the bending dies in the opposite direction to their open position, fluid pressure may be supplied to the inner end of the cylinder 60 through the conduit 65 while the previously supplied pressure fluid is exhausted through the conduit 64. The supplying and exhausting of fluid to and from the cylinder 60 may be controlled by a suitable solenoid valve 66 located in the box or housing 66a. This pressure fluid for the cylinder 60 may be supplied to the solenoid valve by the supply line 40 and this valve may be electrically connected with a control switch 67 by wires extending through the conduits 68 and 41. The switch 67 may have an operating handle 67a and may be so arranged that movement of the handle to one position will result in operation of the cylinder 60 to cause closing of the bending dies 25 and movement of the handle to another position will result in opening or return movement of the bending dies.

With further reference to the arrangement of the bending dies 25, I wish to explain that these dies may be supported in any suitable way so that they are capable of the rocking movement above described. In this instance I show these dies as having a pair of flanges or shoulders 69 on the outer face thereof and spaced apart a distance to receive the pressure rollers 53 therebetween. These flanges or shoulders 69 are arranged to bear against the end faces or shoulders 53a of the rollers 53 whereby the weight of the bending dies will be largely carried by the rollers and will be transmitted by the latter to the plates 58. It will be understood, of course, that when a workpiece is being operated upon the bending dies will be supported to some extent by the workpiece and the die member 24.

Figure 3:
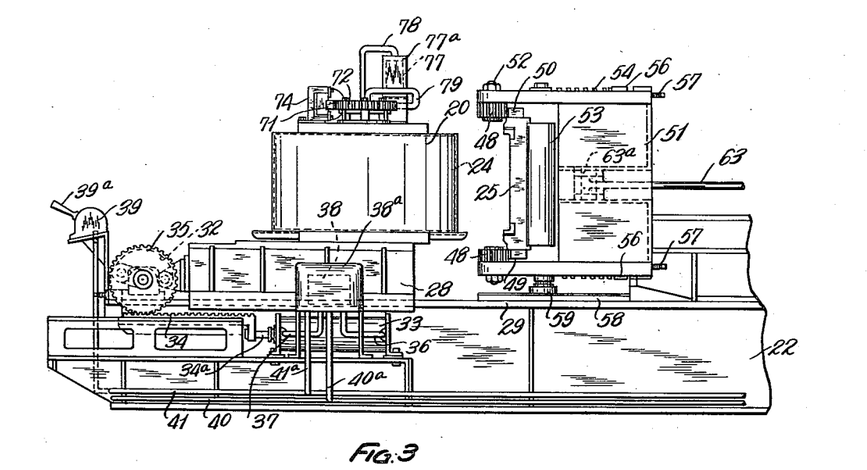
Fig. 3 is a partial side elevation of the machine showing the same with the dies open, and with one of the die members swung to its work-ejecting position.
Figure 4:
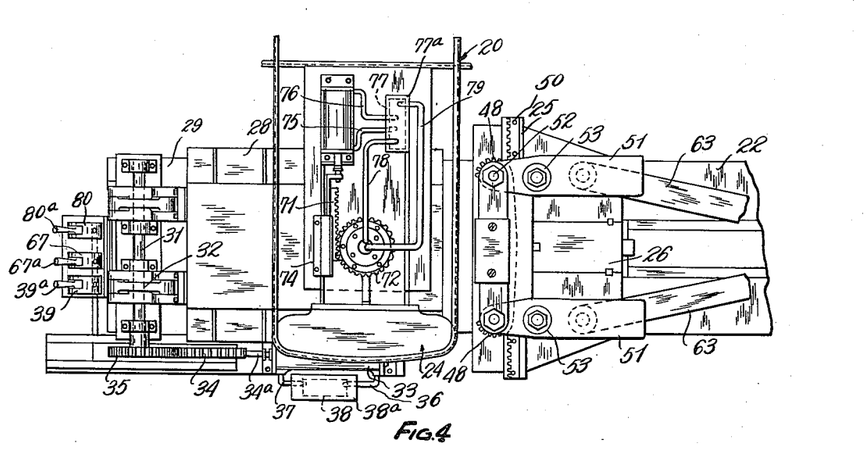
Fig. 4 is a partial plan view of the machine, with the parts in the same relative positions as shown in Fig. 3.

After the bending dies 46 have been actuated to bend the oppositely extending portions of the workpiece toward each other, as above explained, and have been returned to their open or outwardly extending position, shown in Figs. 2 and 12, the cooperating die members 23 and 24 are separated to release their pressure on the workpiece. It will be observed, however, that since the workpiece has now been bent to substantially U-shape, it will be locked on the die member 24 by its flanges so that it can be removed from this die member only by movement longitudinally thereof. To obtain further separation of the die members 23 and 24 than is afforded by the throw of the crankshaft 31 to thereby permit the removal of the workpiece, I provide the above-mentioned pivotal mounting for the die carrier 27 which permits this carrier to be rotated or swung from its position of longitudinal alignment to a transversely extending position, as shown in Figs. 3 and 4. When the carrier 27 and the die member 24 thereon have been swung to this transverse position, the U-shaped workpiece which is now in the form of the cabinet section illustrated in Fig. 7, can be stripped from the die member 24 by endwise movement relative thereto.

For causing such swinging of the die carrier 27 and the die member 24 to the transversely extending discharge position, I may provide any appropriate power means, such as the double acting fluid pressure cylinder 70 which may be mounted on the carrier and which actuates a rack 71 meshing with a gear or gear sector 72 carried by the post or spindle 30 of the die slide 28. The post or spindle 30 is fixed on the die slide and carries the gear or gear sector 72 which is bolted or otherwise fixed to the post. The rack 71 is connected with the piston of the cylinder 70 by means of the rod 73 and is held in mesh with the gear sector 72 by a guideway 74 so that reciprocation of the rack will cause swinging of the die carrier on the post 30 of the slide.

Pressure fluid connections 75 and 76 may be provided at the opposite ends of the cylinder 70 and the supplying and exhausting of fluid to and from the cylinder may be controlled by a suitable solenoid valve 77 located in the box or housing 77a. A fluid pressure supply pipe 78 connects the solenoid valve with the supply line 40 and wires extending within the conduit 79 connect the solenoid valve with a control switch 80 which is located adjacent the control switch 39 and 67. This control switch has a handle 80a which, when moved to one setting, will cause operation of the cylinder 70 and corresponding swinging of the die carrier to the discharge position, and movement of the lever to another setting will cause operation of the cylinder 70 to swing the die carrier back to its position of longitudinal alignment. Since the cylinder 70 and the box 77a containing the solenoid valve move with the die carrier 27, I arrange the conduit 79 and supply pipe 78 to extend through the hollow post or spindle 30 and provide flexible sections therein which will permit swinging of the die carrier without damage to this pipe and conduit.

Figure 5:
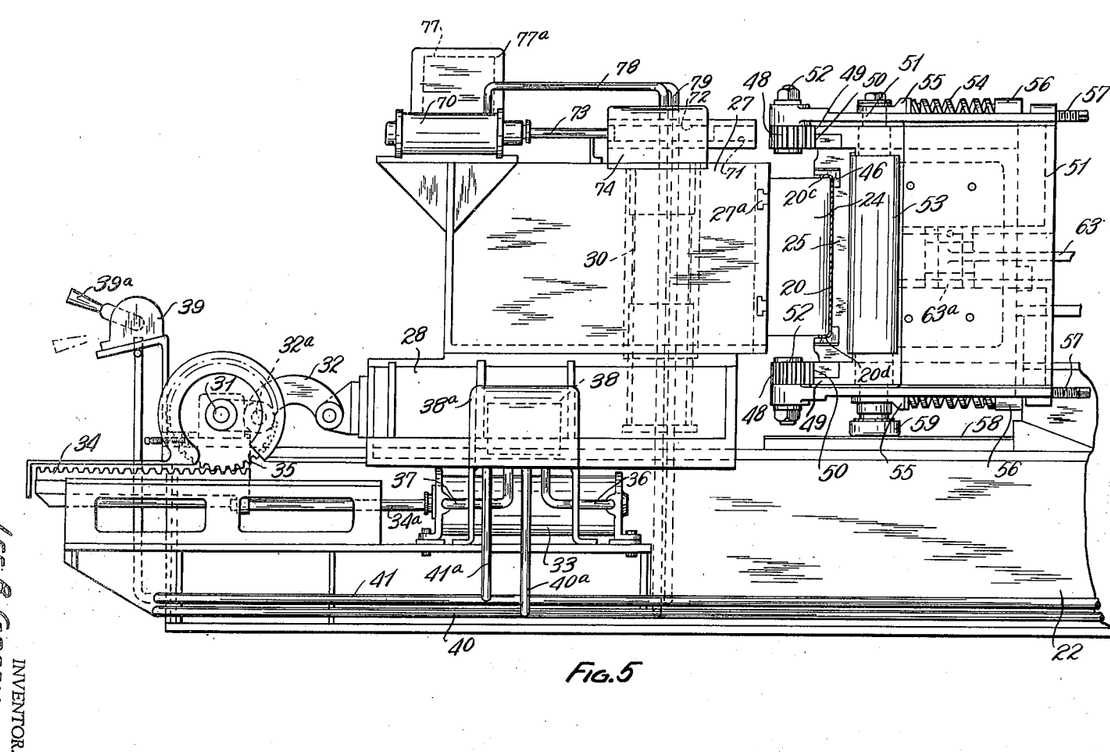
Fig. 5 is a side elevation showing a portion of the machine on a larger scale with the clamping dies closed and with the workpiece shown therein in cross-section.

When the dies 23 and 24 are closed into clamping engagement with the workpiece 20 preparatory to actuation of the bending dies 25, it is desirable that the movable die member 24 be held or locked against opening movement until after the bending operation has been performed. This is desirable because the bending operation causes a substantial force to act on the die member 24 in a direction tending to move the same away from the stationary die member 23 and if any separation of these die members were permitted, the bending operation would not be carried out properly. For thus locking or holding the die member 24 in closed position, I provide locking means which is preferably incorporated in the means for actuating the die slide 28. In the apparatus herein illustrated, I obtain this desired locking effect by arranging the links 32 relative to the axis of the crankshaft 31 such that a toggle is formed which assumes its straight or locked position when the die member 24 has been moved to closed position. When this occurs the pivot 32a between the crankshaft and links moves slightly beyond dead center to produce the desired locked effect. The links 32 are preferably of curved form, as shown in Figs. 1 and 5, so that they will straddle the crankshaft when the latter is rotated through 180° to move the die member 24 to its open position.

Figure 6:
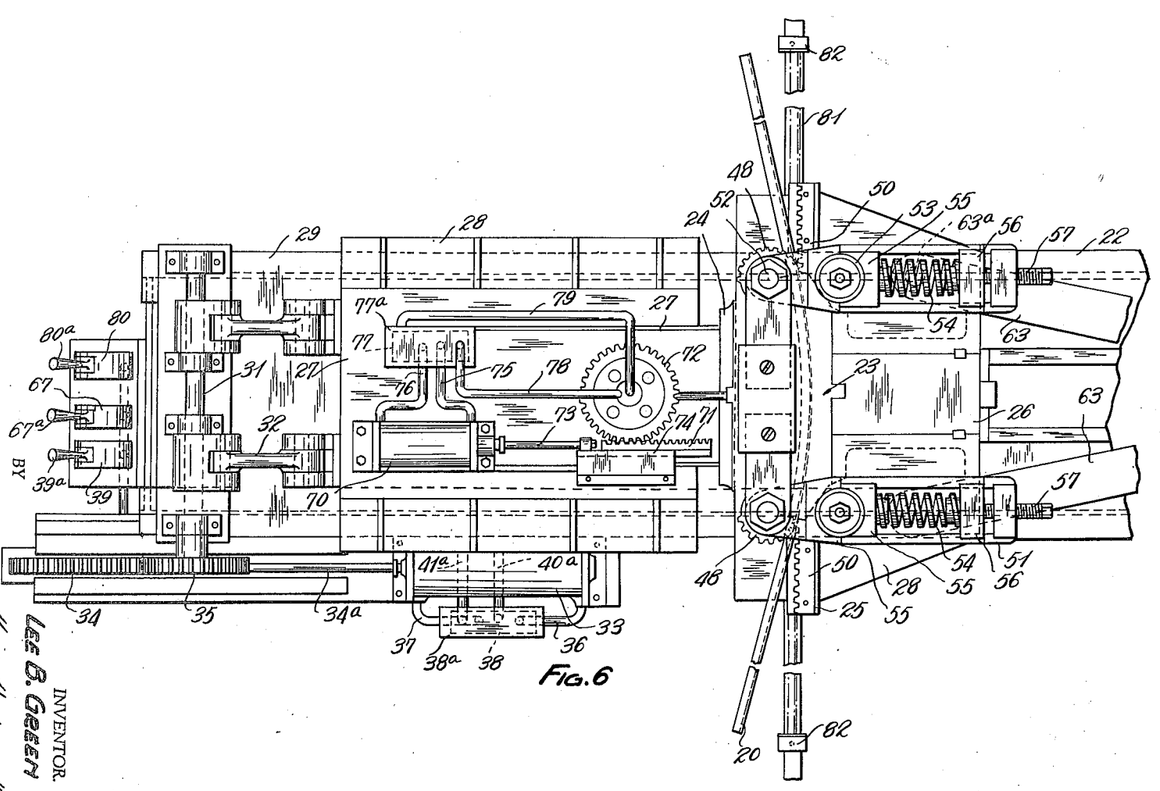
Fig. 6 is a plan view of the apparatus shown in Fig. 5.

As shown in Fig. 6, I may provide oppositely extending work supports 81 by which the elongated workpiece 20 may be supported or rested preparatory to the closing of the clamping dies 23 and 24 thereon. These work supports may have stops or gage blocks 82 thereon against which the ends of the workpiece are engaged for centering the workpiece in the machine.

Figure 17:
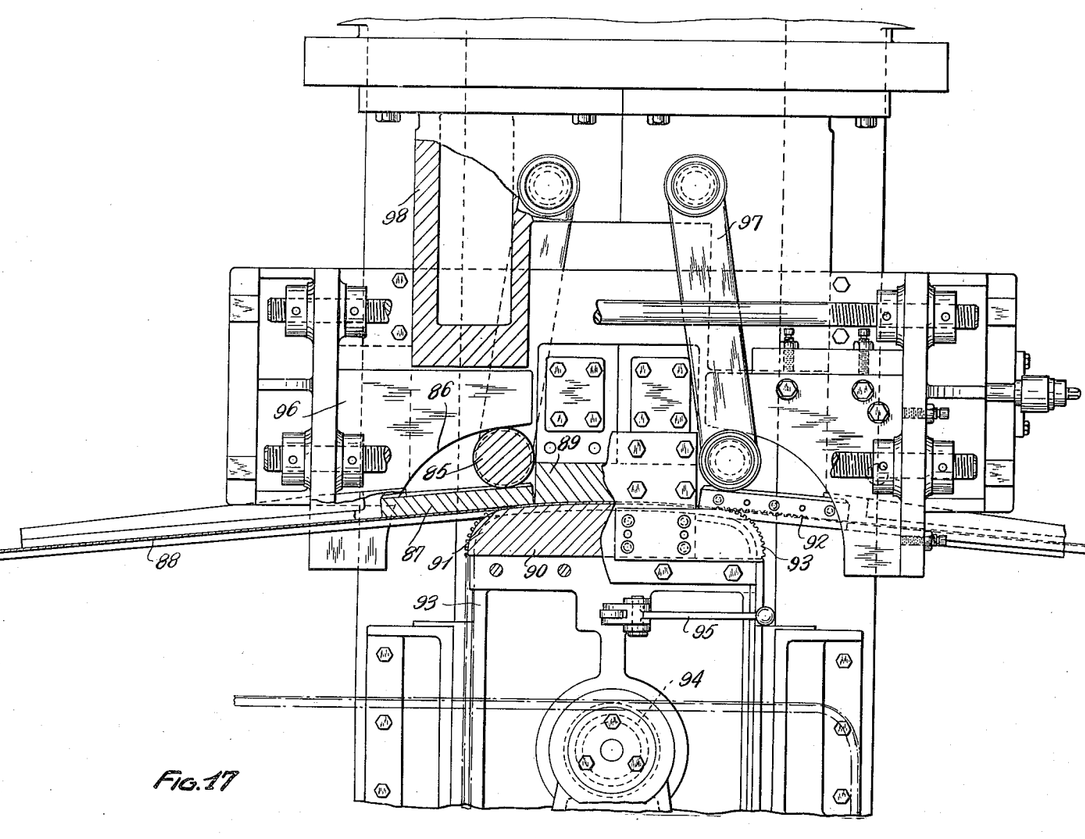
Fig. 17 is a partial plan view, with portions in section, showing a modified form of my metal working machine.

Instead of actuating the bending dies by the means of the swinging wing-like structures 51, as above explained, I may actuate them in other ways such as by means of suitably located cams, as illustrated in the modified arrangement of Fig. 17. In this modified arrangement I show a metal working machine or tangent bender embodying the same general principles as the machine already described, but in which the pressure rollers 85 operate against curved cams 86 in obtaining the desired rocking actuation of the bending dies 87. In this modified form of machine the flanged workpiece 88 is clamped or held by cooperating stationary and movable die members 89 and 90 and the movable die member has curved end portions or extensions 91 around which the projecting portions of the workpiece are to be bent by rocking movement of the bending dies 87. The die member 90 extends snugly between the flanges of the workpiece and the die members 87 and 89 have spaced flanges or projections which overlie the flanges of the workpiece and cooperate with the faces of the die member 90 to hold the flanges of the workpiece against buckling or distortion during the bending operation. Skewing or relative slipping between the bending dies 87 and the curved portions of the die member 90 is prevented by gear sectors 93 provided on the frame or other suitable portions of the machine and racks 92 carried by the bending dies and meshing with such gear sectors. The carrier 93 for the die member 90 is pivoted on a spindle or post 94 for swinging movement similar to the die carrier 27 and may be swung by power means as above explained or manually by means of the handle 95.

The cams 86 are carried by or formed on laterally adjustable members 96 and are so formed or located with respect to the curved end portions 91 that movement of the pressure rollers along these cams will cause tangential rocking of the bending dies 87 around such curved die portions to thereby bend the outwardly extending portions of the workpiece 88 toward each other and into substantial parallelism. The pressure rollers 85 may be carried by a pair of diverging links 97 which have their outer ends connected to a reciprocable cross-head 98 which is adapted to be actuated by any suitable power means such as a fluid pressure cylinder similar to the cylinder 60 shown in Fig. 2. It is deemed unnecessary to describe the modified arrangement of Fig. 15 in greater detail inasmuch as this apparatus is in other respects similar to the machine above described.

Although I have illustrated and described my improved metal working machine or tangent bender as being used for bending a flanged metal workpiece into substantially U-shape, I desire it to be understood that my invention is also applicable to the forming of a single bend in any flanged metal member, such as structural bars of angle or channel cross-sectional shape. When a single bend is to be formed in such a flanged or channel shaped member, I provide a pair of cooperating die members for gripping the work, as above explained, but provide only one bending die instead of two. It will be understood also that although I have shown the cabinet section or workpiece 20 as having flanges along both edges, my apparatus is also applicable to similar workpieces or structural members having only one longitudinally extending flange.

From the foregoing description and the accompanying drawings, it will now be readily seen that I have provided an improved metal working machine with which flanged metal members can be rapidly and economically bent or formed to a desired shape or curvature without buckling or distortion of the flange. It will be seen furthermore that with my improved bending machine metal cabinet sections, roof or deck carlings and other desired metal products can be produced economically and with a desired regularity or uniformity. It will also be seen that in my improved apparatus cooperating die members grip the flanged workpiece and then a portion or portions thereof are bent to the desired curvature during which the flange or flanges of the workpiece are held against buckling or distortion. Likewise, it will be seen that in my machine the bending dies have a tangential rocking movement during which relative slippage or skewing is prevented such as might damage the work or the dies themselves. Moreover, it will be seen that I have provided novel actuating means for the dies whereby the bending operation can be expeditiously carried out and whereby one of the die members can be swung to a discharge position to permit the removal of the workpiece therefrom.

While I have illustrated and described the improved metal working machine or tangent bender of my invention in a somewhat detailed manner, it will be understood, of course, that I do not wish to be limited to the particular details of construction and arrangements of parts herein disclosed, but regard my invention as including such changes and modifications as to not constitute a departure from the spirit of the invention and the scope of the appended claims.

Having thus described my invention, I claim:

1. In a machine of the character described, a pair of die members relatively movable toward and from each other and one of which has an angular projection adapted to overlie a side portion of the other when the die members are closed, said other die member having a curved portion projecting beyond said one die member, and a third die member having a substantially flat face adapted to extend substantially tangentially to said curved portion when the first-mentioned die members are closed and an angular projection also adapted to overlie a side portion of said other die member, means for actuating said third die member so as to cause the point of tangency to travel around said curved portion including a rack on said third die member having its pitch line lying substantially in the plane of said flat face and a gear sector fixed with respect to said one die member and with which said rack meshes, and a spring-pressed roller acting on the third die member to hold said rack and sector in mesh and to press said third die member against said curved portion during travel of the point of tangency therearound.

2. In a machine of the character described, a frame, a pair of die members thereon relatively movable toward and from each other and one of which has a curved portion, a third die member having a substantially flat face and arranged so that said flat face extends substantially tangentially to said curved portion when the first-mentioned die members are closed, means for rocking said third die member to cause the point of tangency to travel around said curved portion, and intermeshing gear teeth on said frame and third die member for preventing relative slippage between the latter and said curved portion, said intermeshing gear teeth being provided by a rack on said third die member having its pitch line lying substantially in the plane of said flat face and a gear sector on said frame engaged by the rack and having a pitch line which conforms to the curvature of said curved die portion when said first mentioned die members are closed.

3. In a machine of the character described, a frame, a pair of male and female dies on said frame arranged for relative closing movement for engagement with opposite sides of the web portion of an elongated metal workpiece having spaced longitudinal flanges, the male die comprising a member having curved portions at opposite sides thereof and other portions engageable with the inner faces of said flanges, the female die comprising an intermediate member having spaced portions adapted to engage the outer faces of said flanges and a pair of outer die members on opposite sides of said intermediate member, said outer die members being plate-like members arranged for closing movement relative to said male die member by substantially tangential rocking on said curved portions for bending oppositely extending portions of said workpiece around said curved portions, gear sectors on said frame adjacent opposite sides of the intermediate member of said female die, racks on said outer die members meshing with said gear sectors, and means for causing such relative closing movement of the outer die members, said outer die members having spaced portions adapted to engage the outer faces of said flanges to prevent buckling thereof during bending of the workpiece.

4. In a machine of the character described, a frame, a female die on said frame comprising an intermediate die member having spaced flanges and a pair of outer die members on opposite sides of said intermediate member and having spaced flanges aligned substantially with the flanges of said intermediate member, a male die adapted to extend between the spaced flanges of said intermediate die member and having curved portions at the sides thereof adjacent said outer die members, means for causing relative closing and opening movements between said male and intermediate die members, said outer die members having between their spaced flanges substantially flat faces which are substantially tangent to said curved portions when the male die is in its closed position and said outer die members being arranged to have closing and opening rocking movements during which the points of tangency travel around said curved portions, and means for actuating said outer die members comprising swinging members having spring-pressed rollers bearing on the backs of said outer die members substantially on radial lines passing through said points of tangency.

5. In a metal working machine, a frame, a slide movable thereon, a pair of cooperating die members engageable with opposite sides of a workpiece and one of which is carried by said slide, other die means adapted to operate on the workpiece while said cooperating die members are closed, a crankshaft on said frame, and a connecting member between said shaft and slide, said connecting member being shaped to straddle said crankshaft and having a pivotal connection with the latter which is adapted to travel beyond dead-center to form a lock for holding said cooperating die members closed.

6. In a machine of the character described, a frame, a slide movable thereon, a die carrier on said slide, a pair of cooperating die members one of which is on said frame and the other of which is on said die carrier, means for actuating said slide to cause closing and opening of said die members, the die member of said frame being adapted to cooperate with said other die member to form a workpiece to a shape partially surrounding the latter, said carrier being adapted for swinging relative to the slide for moving said other die member to a position to facilitate discharge of the workpiece therefrom, and power means for causing such relative swinging of said die carrier.

7. In a machine of the character described, a frame, a slide movable thereon, a die carrier on said slide, a pair of cooperating die members engageable with opposite sides of an intermediate section of the web portion of an elongated metal workpiece having flanged edges, one die member being on said frame and the other on said carrier, means for actuating said slide to cause closing and opening of said die members, means for bending the oppositely extending portions of said workpiece around said other die member and toward each other while said die members are closed, said carrier being adapted for swinging relative to the slide for moving said other die member to a position to facilitate discharge of the workpiece therefrom, and means for causing such relative swinging of said die carrier.

8. In a machine of the character described, a frame, a slide movable thereon, a spindle on said slide, a die carrier pivoted on said spindle, a pair of cooperating die members engageable with opposite sides of a workpiece, one of said die members being on said frame and the other being on said carrier, means for actuating said slide to cause closing and opening of said die members, the die member of said frame being adapted to cooperate with said other die member to form a workpiece to a shape partially surrounding the latter, and means for swinging said carrier on said spindle for moving said other die member to a position to facilitate discharge of the workpiece therefrom, the last-mentioned means comprising a gear on said spindle, a reciprocable rack meshing with said gear and a pressure cylinder on said carrier and connected with the rack to reciprocate the same.

9. In a machine of the character described, a frame, a pair of cooperating members thereon engageable with opposite sides of a section of an elongated metal workpiece to grip the same, means for causing relative closing and opening movements between said members, a third member arranged for rocking movement for bending a projecting portion of said workpiece, a structure pivoted on said frame for swinging movement and having a spring-pressed roller thereon arranged with its axis in substantially upright relation and adapted to act on said third member for pressing the same against the workpiece, means for swinging said structure to thereby cause rocking of said third member, a bearing plate on said frame beneath said pivoted structure, and bearing means slidable on said bearing plate and connected with the lower end of said roller for supporting the same.

10. In a machine of the character described, a frame, a pair of cooperating members thereon engageable with opposite sides of a section of an elongated metal workpiece to grip the same, means for causing relative closing and opening movements between said members, a third member arranged for rocking movement for bending a projecting portion of said workpiece, a structure pivoted on said frame for swinging movement and having a spring-pressed element arranged to act on said third member for pressing the same against the workpiece, a power cylinder, a reciprocable crosshead actuated thereby, and a link connecting said crosshead with said pivoted structure for swinging the same.

11. In a machine of the character described, a frame, a pair of cooperating members thereon engageable with opposite sides of a section of an elongated metal workpiece to grip the same, means for causing relative closing and opening movements between said members, a third member arranged for rocking movement for bending a projecting portion of said workpiece and having spaced shoulders on the reverse side thereof, a structure pivoted on said frame for swinging movement and having a spring-pressed roller arranged to act on the reverse side of said third member for pressing the same against the workpiece, said roller having transverse faces in supporting engagement with said spaced shoulders, and means for swinging said structure to thereby cause rocking of said third member.

12. In a machine of the character described, a frame having a die mount thereon and a guideway adjacent thereto, a die slide on said guideway and reciprocable relative to said mount, a pair of stationary and movable die members carried respectively by said mount and slide and adapted for clamping engagement with opposite sides of an intermediate section of an elongated metal workpiece having longitudinal flanges at its side edges, means for actuating said slide, said movable die member having curved portions at its lateral edges, a pair of bending dies adjacent the lateral edges of the stationary die member and arranged for rocking movement around the curved portions of the stationary die member for bending the oppositely projecting ends of the workpiece toward each other, said dies having cooperating portions adapted to hold the flanges of the workpiece against buckling during such bending of the workpiece, a pair of levers pivoted for swinging movement for rocking said bending dies, spring-pressed rollers carried by said levers and arranged to bear against the reverse side of said bending dies for applying pressure thereto, gear sectors on said frame to lie adjacent said curved portions of the movable die member when the latter is in closed position, racks on said bending dies meshing with said gear sectors, and power means on said frame operably connected with said levers for swinging the same.

13. In a machine of the character described, a frame, a pair of cooperating relatively movable members engageable with opposite sides of a portion of an elongated metal member to grip the same, one of said die members having curved portions extending beyond the other die member, a pair of bending dies arranged for rocking movement for bending said metal member around said curved portions, a pair of cams adjacent said curved portions, rollers disposed between the bending dies and said cams and movable therealong to cause rocking of the bending dies, gear sectors on said frame having a curvature conforming substantially to that of said curved portions, and racks on said bending dies meshing with said gear sectors.

14. In a machine of the character described, a frame, a pair of cooperating relatively movable members on said frame and engageable with opposite sides of an elongated metal member to grip the same, one of said members having curved portions at opposite sides thereof, a pair of bending dies arranged for rocking movement for bending portions of said elongated member around said curved portions, a pair of cams adjacent said curved portions, a pair of divergent links pivoted on said frame for swinging away from each other, rollers carried by said links and disposed between said cams and said bending dies and adapted to cause rocking of the latter in response to spreading of said links, gear sectors on said frame having a curvature conforming substantially to that of said curved portions, and racks on said bending dies meshing with said gear sectors.

15. In a machine of the character described, a frame, a female die on said frame comprising an intermediate die member and a pair of outer die members on opposite sides of said intermediate member, a male die adapted to be closed against said intermediate die member and having curved portions at the sides thereof adjacent said outer die members, means for causing relative opening and closing movement between said male and intermediate die members for gripping an intermediate portion of an elongated workpiece, said outer die members having substantially flat faces which are substantially tangent to said curved portions when the male die is in its closed position and said outer die members being arranged to have closing and opening rocking movements during which the points of tangency travel around said curved portions to cause bending of the oppositely extending end portions of the workpiece, and means for actuating said outer die members comprising swinging members pivoted on said frame and having spring-pressed rollers which bear on the backs of said outer die members substantially on radial lines passing through said points of tangency and which rollers traverse said backs of the outer die members during the rocking movements of the latter, the pivot axes of said swinging members being substantially coincident with the centers of curvature of said curved portions of the male die when the latter is in closed position.

16. In a machine of the character described, a frame, a female die on said frame comprising an intermediate die member and a pair of outer die members on opposite sides of said intermediate member, a male die adapted to be closed against said intermediate die member and having curved portions at the sides thereof adjacent said outer die members, means for causing relative opening and closing movement between said male and intermediate die members for gripping an intermediate portion of an elongated workpiece, said outer die members having substantially flat faces which are substantially tangent to said curved portions when the male die is in its closed position and said outer die members being arranged to have closing and opening rocking movements during which the points of tangency travel around said curved portions to cause bending of the oppositely extending end portions of the workpiece, gear sectors on said frame adjacent opposite ends of said intermediate die member and having pitch lines with a radius of curvature conforming to that of said curved portions when the male die is in closed position, racks on said outer die members meshing with said gear sectors and having their pitch lines lying substantially in the planes of said flat faces, and means for actuating said outer die members comprising swinging members pivoted on said frame and having spring-pressed rollers which bear on the backs of said outer die members substantially on radial lines passing through said points of tangency and which rollers traverse said backs of the outer die members during the rocking movements of the latter, the pivot axes of said swinging members being substantially coincident with the centers of curvature of said curved portions of the male die when the latter is in closed position.

LEE B. GREEN.